(12) United States Patent
Yahia et al.

(10) Patent No.: US 12,502,933 B2
(45) Date of Patent: Dec. 23, 2025

(54) REFRIGERANT CIRCUIT FOR A THERMAL TREATMENT SYSTEM

(71) Applicant: VALEO SYSTEMES THERMIQUES, La Verriere (FR)

(72) Inventors: Mohamed Yahia, La Verriere (FR); Bertrand Gessier, La Verriere (FR)

(73) Assignee: Valeo Systemes Thermiques, La Verriere (FR)

( * ) Notice: Subject to any disclaimer, the term of this patent is extended or adjusted under 35 U.S.C. 154(b) by 179 days.

(21) Appl. No.: 18/550,139

(22) PCT Filed: Mar. 15, 2022

(86) PCT No.: PCT/EP2022/056623
§ 371 (c)(1),
(2) Date: Sep. 12, 2023

(87) PCT Pub. No.: WO2022/194825
PCT Pub. Date: Sep. 22, 2022

(65) Prior Publication Data
US 2024/0157763 A1 May 16, 2024

(30) Foreign Application Priority Data

Mar. 15, 2021 (FR) ..................................... 2102561

(51) Int. Cl.
*B60H 1/00* (2006.01)
*B60H 1/32* (2006.01)
(Continued)

(52) U.S. Cl.
CPC ..... *B60H 1/00921* (2013.01); *B60H 1/00278* (2013.01); *B60H 1/32284* (2019.05);
(Continued)

(58) Field of Classification Search
CPC . B60H 1/00278; B60H 1/00921; B60H 1/323
See application file for complete search history.

(56) References Cited

U.S. PATENT DOCUMENTS 11,407,282 B2 * 8/2022 Chopard ............ B60H 1/00885
11,634,004 B2 * 4/2023 Kim ..................... B60H 1/2221
62/259.2
(Continued)

FOREIGN PATENT DOCUMENTS

CN 209274301 U 8/2019
DE 102013206626 A1 10/2014
(Continued)

OTHER PUBLICATIONS

European Patent Office, International Search Report (with English translation) and Written Opinion of corresponding International Application No. PCT/EP2022/056623, dated Jun. 13, 2022.

*Primary Examiner* — Christopher R Zerphey
(74) *Attorney, Agent, or Firm* — Osha Bergman Watanabe & Burton LLP

(57) ABSTRACT

Refrigerant circuit for a thermal treatment system, including a main channel including a compression device, a radiator, an evaporator/condenser, an accumulation device, a first channel and a second channel. The first channel includes an evaporator, the second channel includes a first heat exchanger configured to exchange heat between the refrigerant and a heat transfer fluid flowing through a heat transfer fluid circuit. The refrigerant circuit further includes a third channel having a second heat exchanger configured to exchange heat between the refrigerant and the heat transfer fluid of the heat transfer fluid circuit.

12 Claims, 8 Drawing Sheets

(51) Int. Cl.
*F25B 5/00* (2006.01)
*F25B 6/04* (2006.01)
*F25B 25/00* (2006.01)
*F25B 30/02* (2006.01)

(52) U.S. Cl.
CPC .............. *B60H 1/323* (2013.01); *F25B 5/00* (2013.01); *F25B 6/04* (2013.01); *F25B 25/005* (2013.01); *F25B 30/02* (2013.01); *B60H 2001/00307* (2013.01); *B60H 2001/00928* (2013.01); *B60H 2001/00949* (2013.01)

(56) References Cited

U.S. PATENT DOCUMENTS

| | | |
|---|---|---|
| 11,679,642 B2 | 6/2023 | Yahia |
| 11,987,095 B2 * | 5/2024 | Kim ................... H01M 10/613 |
| 12,083,863 B2 * | 9/2024 | Kim ................... B60H 1/3213 |
| 2016/0001636 A1 * | 1/2016 | Terada ................ F25B 5/02 |
| | | 62/160 |
| 2017/0158081 A1 * | 6/2017 | Kim ................... B60H 1/00278 |
| 2020/0031194 A1 * | 1/2020 | Lee ................... B60H 1/00392 |
| 2023/0191867 A1 | 6/2023 | Nicolas et al. |

FOREIGN PATENT DOCUMENTS

| | | | | |
|---|---|---|---|---|
| FR | 3037639 A1 | 12/2016 | | |
| FR | 3076342 A1 | 7/2019 | | |
| FR | 3086334 A1 | 3/2020 | | |
| WO | WO2020242096 | * | 12/2020 | ............... B60H 1/14 |
| WO | WO-2020242096 A1 | * | 12/2020 | ......... B60H 1/00278 |

\* cited by examiner

REFRIGERANT CIRCUIT FOR A THERMAL TREATMENT SYSTEM

TECHNICAL FIELD

The field of the present invention is that of thermal treatment systems used for heating or cooling a space or a component of a vehicle, notably a component of a powertrain of this vehicle.

BACKGROUND OF THE INVENTION

Motor vehicles are currently equipped with a refrigerant circuit and with at least one heat transfer fluid circuit, which are both used to contribute to a heat treatment of various zones or various components of the vehicle. It is notably known for this refrigerant circuit and/or the heat transfer fluid circuit to be used to thermally treat an air flow sent into the passenger compartment of the vehicle equipped with such a circuit.

In another application of this circuit, it is known for the heat transfer fluid circuit to be used to cool components of the powertrain of the vehicle, such as an electrical storage device, the latter being used to supply energy to an electric motor capable of moving the vehicle. The heat treatment system thus supplies the energy capable of cooling the electrical storage device when it is used during driving phases.

Car manufacturers are constantly striving to improve their vehicles. These improvements include in particular the design of fluid circuits that enable heat exchange to meet a variety of objectives, while limiting the energy consumption used to meet these objectives.

BRIEF SUMMARY OF THE INVENTION

In this context, the present invention proposes a refrigerant circuit for a vehicle thermal treatment system through which a refrigerant flows, comprising a main path starting at a first convergence zone and ending at a junction zone, the main path comprising a compression device, a radiator configured to perform a heat exchange between the refrigerant and an interior air flow intended to be sent into a vehicle passenger compartment, an evaporator/condenser configured to perform a heat exchange between the refrigerant and an exterior air flow outside the vehicle passenger compartment, and an accumulation device, the refrigerant circuit comprising a first path and a second path, both starting at the junction zone and ending at the first convergence zone, the first path comprising an evaporator configured to perform a heat exchange between the refrigerant and the interior air flow, the second path comprising a first heat exchanger configured to perform a heat exchange between the refrigerant and a heat transfer fluid circulating within a heat transfer fluid circuit of the vehicle, the refrigerant circuit further comprising a third path starting at a first divergence zone arranged on the main path between the radiator and the evaporator/condenser and ending at the junction zone, said third path comprising a second heat exchanger configured to perform a heat exchange between the refrigerant and the heat transfer fluid of the heat transfer fluid circuit.

Under such an architecture, it is possible to discharge calories from the refrigerant by means of the heat transfer fluid, specifically by circulating the refrigerant within the third path. Such an operation is also beneficial for the heat transfer fluid circuit in terms of heating of the heat transfer fluid. Combining the refrigerant condensation operation with the heat transfer fluid heating operation, rather than carrying out these two operations independently of each other, thus ensures energy savings.

The refrigerant is circulated in the main circuit by the compression device. This compresses the refrigerant to a high pressure and circulates it through the main path to the radiator. The radiator is a device for making it possible to perform a heat exchange between the refrigerant and the interior air flow. As the refrigerant is at high pressure, it is also at high temperature, and thus makes it possible to heat the interior air flow passing through the radiator. The interior air flow is then sent into the vehicle passenger compartment to heat the latter. The radiator therefore contributes to the comfort of the vehicle passenger compartment by heating the interior air flow. To this end, the radiator can be arranged within a ventilation, heating and/or air-conditioning system, configured to circulate the interior air flow in order to manage the comfort of the vehicle passenger compartment. Said ventilation, heating and/or air-conditioning system can comprise means for guiding the interior air flow so that the latter can bypass the radiator if heating of the vehicle passenger compartment is not required.

The evaporator/condenser also performs a heat exchange function. Depending on the operating mode of the refrigerant circuit, the refrigerant is either condensed or evaporated by the exterior air flow. To enable this heat exchange to take place, the evaporator/condenser must be arranged across a path of the exterior air flow, for example by being installed on a front panel of the vehicle.

The accumulation device is disposed within the main path, upstream of the compression device with respect to a circulation direction of the refrigerant. The accumulation device contributes to the smooth operation of the compression device by retaining a potential liquid fraction of refrigerant that has not evaporated during its circulation within the refrigerant circuit. As the compression device can only compress refrigerant in a gaseous state, the accumulation device ensures that refrigerant in a liquid state does not circulate through the compression device and damage it.

The first and second paths extend between the junction zone, where the main path ends, and the first convergence zone, where the main path begins. The junction zone corresponds to a point where there is both convergence and divergence of paths. The function of the evaporator in the first path is to exchange heat between the low-temperature refrigerant and the interior air flow. The latter is then sent into the vehicle passenger compartment to cool it. Like the radiator, the evaporator can be disposed within the ventilation, heating and/or air-conditioning system.

Depending on requirements, the interior air flow can therefore pass through the radiator, or through the evaporator and around the radiator, to heat and cool the vehicle passenger compartment respectively. The interior air flow can also pass through the evaporator and then the radiator to dehumidify the vehicle passenger compartment. To achieve this, the moist interior air flow first passes through the evaporator to condense and retain the moisture, then the dry interior air flow passes through the radiator to be sent into the warm and dry vehicle passenger compartment.

The second path enables the refrigerant circulating through it to interact with the heat transfer fluid of the heat transfer fluid circuit via the first heat exchanger. The refrigerant can then cool the heat transfer fluid, which then circulates within the heat transfer fluid circuit to cool electrical or electronic components that can generate heat during their operation.

The third path begins at the first divergence zone on the main path between the radiator and the evaporator/condenser. As a result, on leaving the radiator, the refrigerant can either continue its circulation within the main path to the evaporator/condenser, or can circulate within the third path, where the second heat exchanger can perform these functions by interacting with the heat transfer fluid. The refrigerant circulating in the third path then joins the junction zone to circulate in the first path and/or in the second path as required.

According to a feature of the invention, the first heat exchanger is configured to thermally treat, via the heat transfer fluid, at least one electric motor of the vehicle or at least one electrical storage element of the vehicle.

According to a further feature of the invention, the second heat exchanger is configured to thermally treat, via the heat transfer fluid, at least one electrical storage element of the vehicle. Depending on the arrangement of the heat transfer fluid circuit, the heat transfer fluid can be cooled by the refrigerant within the first heat exchanger or the second heat exchanger, and then subsequently cool the electric motor or electrical storage element of the vehicle. The temperature of the electric motor can reach a high level, for example, when the vehicle is travelling at high speed on a freeway. With regard to the electrical storage element, this can reach a high temperature after a rapid recharging operation. In order to avoid overheating leading to a potential malfunction, the electric motor and/or the electrical storage element must be cooled by means of the heat transfer fluid.

The heat transfer fluid can also heat up the electrical storage element after heat exchange with the refrigerant within the second heat exchanger. If the electrical storage element is at too low a temperature, it loses efficiency due to excessive internal resistance, resulting in low efficiency of a vehicle powertrain associated with the electrical storage element. The latter can therefore need to be heated by the heat transfer fluid. It is particularly in this situation that it is possible to discharge the calories from the refrigerant circulating in the third path, and to condense it with the aid of the heat transfer fluid via the second heat exchanger.

According to a feature of the invention, the refrigerant circuit comprises a first expansion member arranged on the first path between the junction zone and the evaporator. This first expansion member makes it possible to lower the temperature of the refrigerant by expanding it. Once expanded, the refrigerant can then flow through the evaporator at low temperature to cool the interior air flow.

According to a feature of the invention, the refrigerant circuit comprises a second expansion member arranged on the second path between the junction zone and the first heat exchanger. The second expansion member lowers the temperature of the refrigerant circulating in the second path. Once expanded and at a low temperature, the refrigerant can flow through the first heat exchanger, thereby cooling the heat transfer fluid also flowing through the first heat exchanger.

According to a feature of the invention, the refrigerant circuit comprises a first expansion device arranged on the main path between the first divergence zone and the evaporator/condenser. The special feature of the first expansion device compared with the previously mentioned expansion members is that the expansion device is able to expand the refrigerant at different pressures. In addition, the first expansion device can also circulate the refrigerant without expanding it. As the first expansion device is arranged upstream of the evaporator/condenser, the first expansion device either expands the refrigerant if the evaporator/condenser acts as an evaporator, or allows the refrigerant to circulate without expanding it if the evaporator/condenser acts as a condenser.

According to a feature of the invention, the refrigerant circuit comprises a second expansion device arranged on the third path between the first divergence zone and the second heat exchanger. Like the first expansion device, the second expansion device can expand the refrigerant to different pressures, or allow it to circulate without expansion before it passes through the second heat exchanger. For example, the second expansion device can let the refrigerant circulate if the aim is to heat the heat transfer fluid and condense the refrigerant. The second expansion device can also expand the refrigerant at low pressure if the aim is simply to cool the heat transfer fluid. The second expansion device can also expand the refrigerant at intermediate pressure to cool the heat transfer fluid at the second heat exchanger, then join the junction zone to circulate within the second path to be expanded at low pressure to also cool the heat transfer fluid at the first heat exchanger.

According to a feature of the invention, the refrigerant circuit comprises a fourth path starting in a second divergence zone arranged on the main path between the evaporator/condenser and the junction zone, and ending in a second convergence zone arranged on the main path between the first convergence zone and the accumulation device. In other words, the fourth path bypasses the first or second path at the evaporator/condenser outlet. The fourth path therefore forms part of the refrigerant circuit and participates in a heat pump function.

According to a feature of the invention, the fourth path comprises a valve controlling the circulation of refrigerant in the fourth path. When the valve is open, the refrigerant circulates within the fourth path. When the valve is closed, the refrigerant continues to circulate in the main path to the junction zone.

The invention also relates to a thermal treatment system for a vehicle, comprising a refrigerant circuit as previously described, and a heat transfer fluid circuit through which a heat transfer fluid flows, said heat transfer fluid circuit comprising a main branch provided with a first pump, a first heat exchanger configured to thermally treat an electric motor of the vehicle, a second heat exchanger configured to perform a heat exchange between the heat transfer fluid and the exterior air flow, a second pump and a third heat exchanger configured to thermally treat an electrical storage element of the vehicle, the heat transfer fluid circuit further comprising a first branch, a second branch and a third branch, the first branch comprising the first heat exchanger, the second branch being arranged in parallel with the first branch, the third branch being arranged in parallel with the first branch and the second branch and comprising the second heat exchanger, the heat transfer fluid circuit comprising a heat transfer fluid circuit bypass device, the bypass device being able to separate the heat transfer fluid circuit into a first loop comprising, on the one hand, a first portion of the main branch and at least one branch from the first branch or the second branch, and, on the other hand, into a second loop comprising a second portion of the main branch and at least one branch from the first branch or the third branch.

The thermal treatment system according to the invention ensures cooperation between the refrigerant circuit and the heat transfer fluid circuit, so that each of the circuits can perform one or more functions of its own, said functions being performed specifically by one of the circuits but being able to be implemented with the help of the other circuit.

The main function of the refrigerant circuit is to ensure the comfort of the vehicle passenger compartment, while the heat transfer fluid is used to thermally treat the electric motor and the electrical storage element. As described above, both the first heat exchanger and the second heat exchanger provide heat exchange between the refrigerant and the heat transfer fluid. In this way, the refrigerant can indirectly provide thermal treatment for the electric motor and/or electrical storage element, for example by cooling or heating the heat transfer fluid via the first heat exchanger and/or the second heat exchanger. Conversely, the heat transfer fluid can indirectly contribute to the comfort of the vehicle passenger compartment or to the smooth running of the cooling cycle of the refrigerant, by condensing or evaporating the refrigerant via the first heat exchanger and/or the second heat exchanger.

The invention also relates to a method for controlling a refrigerant fluid circuit as described beforehand, in which:
- in a vehicle passenger compartment cooling mode, the second heat exchanger is used to condense the refrigerant by heating the heat transfer fluid circulating in the heat transfer fluid circuit,
- in a vehicle passenger compartment heating mode, the second heat exchanger is used as a refrigerant evaporator or condenser, respectively cooling or heating the heat transfer fluid circulating in the heat transfer fluid circuit.

In the vehicle passenger compartment cooling mode, the refrigerant is condensed by the heat transfer fluid in the second heat exchanger, to optimize expansion of the refrigerant before it passes through the evaporator. This condensation of the refrigerant thus leads to heating of the heat transfer fluid.

During the vehicle passenger compartment heating mode, the function of the second heat exchanger depends on the function assigned to the heat transfer fluid circulating in the heat transfer fluid circuit. If the aim is to heat the heat transfer fluid, then the second heat exchanger acts as a condenser. If the aim is to cool the heat transfer fluid, then the second heat exchanger acts as an evaporator.

According to a feature of the method, during the vehicle passenger compartment heating mode:
- in a heat transfer fluid cooling step, the refrigerant circulating in the third path is expanded to a first pressure level before passing through the second heat exchanger,
- in a heat transfer fluid heating step, the refrigerant is circulated in the third path without expansion or by expansion to a second pressure level lower than the first pressure level.

The refrigerant is expanded by the second expansion device mentioned above. By expanding the refrigerant to the first pressure level, the temperature of the refrigerant is lowered. The refrigerant thus cools the heat transfer fluid as it passes through the second heat exchanger.

When the refrigerant is not expanded, it passes through the second heat exchanger at a higher temperature than the heat transfer fluid also passing through the second heat exchanger. The heat transfer fluid is therefore heated as it passes through the second heat exchanger. When the refrigerant is expanded to the second pressure level, its temperature remains high enough to heat the heat transfer fluid. Expansion of the refrigerant to the second pressure level, however, prevents overheating of the heat transfer fluid.

BRIEF DESCRIPTION OF THE DRAWINGS

Further features and advantages of the invention will become more clearly apparent both from the following description and from a number of exemplary embodiments, which are given by way of non-limiting indication with reference to the attached schematic drawings, in which.

DETAILED DESCRIPTION OF THE INVENTION

The terms upstream and downstream used in the following description refer to the circulation direction of the fluid in question, that is to say the refrigerant fluid, the heat transfer fluid, an exterior air flow outside a vehicle interior and/or an interior air flow sent to the vehicle interior.

Figure 1:
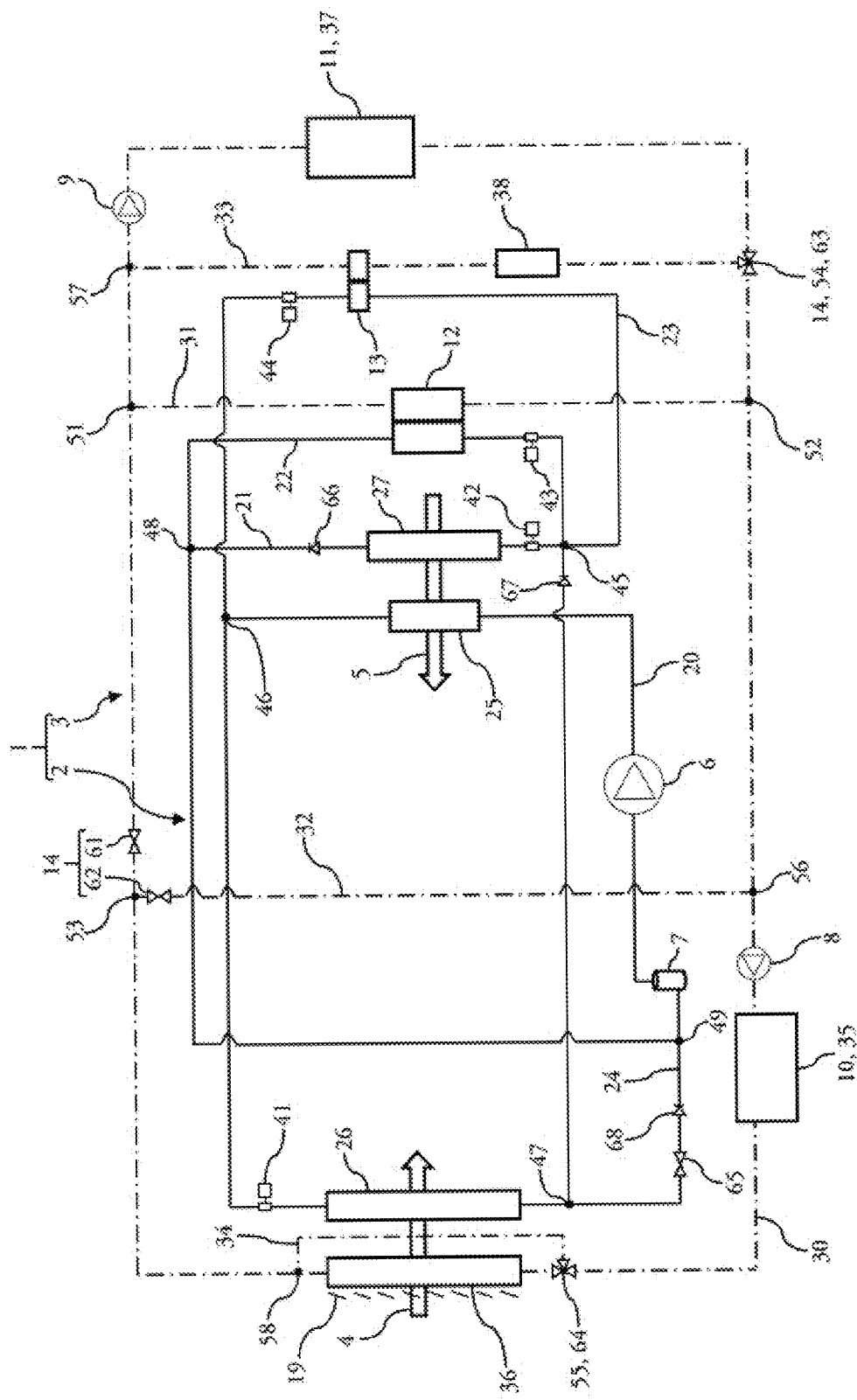
FIG. 1 is a schematic diagram of a thermal treatment system according to the invention, comprising a refrigerant circuit and a heat transfer fluid circuit.

In FIG. 1, a refrigerant circuit is shown in solid lines and a heat transfer fluid circuit is shown in dot-and-dash lines. In FIGS. 2 to 8, for each circuit, the portions through which the respective fluid flows are shown in solid lines, and the portions with no fluid circulation are shown in dotted lines. In addition, the circulation of each fluid is illustrated by indicating its direction of circulation with arrows. The solid lines indicating fluid circulation are also of a different thickness for the refrigerant circuit. More precisely, the thickest solid lines correspond to portions in which the refrigerant circulates at high pressure, the solid lines of medium thickness correspond to portions in which the refrigerant circulates at intermediate pressure, and the thinnest solid lines correspond to portions in which the refrigerant circulates at low pressure.

The terms "first", "second", etc. used in the description are not intended to indicate a level of hierarchy or to order the elements they accompany. These terms serve to distinguish the elements which they accompany and can be interchanged without narrowing the scope of the invention.

FIG. 1 illustrates a thermal treatment system 1 according to the invention and configured to be arranged in particular within a vehicle. The thermal treatment system 1 comprises a refrigerant circuit 2 shown in solid lines and a heat transfer fluid circuit 3 shown in dot-and-dash lines. A refrigerant flows through the refrigerant circuit 2, and a heat transfer fluid flows through the heat transfer fluid circuit 3. By way of example, the refrigerant can be a fluid of the R134a or R1234yf type, while the heat transfer fluid can be glycol water, for example.

The refrigerant circuit 2 comprises a plurality of paths forming a closed circuit. In particular, the refrigerant circuit 2 comprises a main path 20 that starts at a first convergence zone 48 and ends at a junction zone 45. Depending on the circulation direction of the refrigerant, it circulates within the main path 20 from the first convergence zone 48 to the junction zone 45. The main path 20 comprises, in particular, a compression device 6 for circulating the refrigerant within the refrigerant circuit 2, and for bringing said refrigerant to a high pressure and high temperature.

The main path 20 comprises a radiator 25, arranged downstream of the compression device 6 with respect to a circulation direction of the refrigerant within the refrigerant circuit 2. The radiator 25 assures a heat exchange operation between the high-pressure, high-temperature refrigerant and an interior air flow 5 intended for delivery to a vehicle passenger compartment. During the heat exchange within the radiator 25, the refrigerant heats the interior air flow 5, which is then sent to the vehicle passenger compartment to heat it. The radiator 25 can be installed as part of a ventilation, heating and/or air-conditioning system. As the refrigerant necessarily passes through the radiator 25, the ventilation, heating and/or air-conditioning system can, for example, comprise means for guiding the interior air flow 5 so that the latter bypasses the radiator 25 if heating of the vehicle passenger compartment is not required.

The main path 20 also comprises an evaporator/condenser 26 configured to perform a heat exchange between the refrigerant and an exterior air flow 4 outside the vehicle passenger compartment. To enable heat exchange to take place, the evaporator/condenser is positioned so as to be level with the trajectory of said exterior air flow 5. To this end, the evaporator/condenser 26 can, for example, be positioned at the level of a radiator grille on the front of the vehicle. The main path 20 also comprises a first expansion device 41 located upstream of the evaporator/condenser 26. The first expansion device 41 is designed to expand the refrigerant before the latter passes through the evaporator/condenser 26. The first expansion device 41 can also circulate the refrigerant without affecting its pressure. The evaporator/condenser 26 can act as a condenser or evaporator, depending on an operating mode of the thermal treatment system 1.

The junction zone 45 is located downstream of the evaporator/condenser 26 and separates the main path 20 into a first path 21 and a second path 22.

The first path 21 comprises an evaporator 27 for heat exchange between the refrigerant and the interior air flow 5. The evaporator 27 can be arranged within the ventilation, heating and/or air-conditioning system described above. The first path 21 also comprises a first expansion member 42 for expanding the refrigerant. Once the refrigerant has been expanded, it passes through the evaporator 27 at a low temperature, thereby cooling the interior air flow 5 before it is sent to the vehicle passenger compartment. In this way, the evaporator 27 contributes to the cooling of the vehicle passenger compartment. The first expansion member 42 can also be completely closed when air conditioning of the vehicle passenger compartment is not required, and it is therefore unnecessary to circulate the refrigerant in the first path 21.

As previously described, the interior air flow 5 can be cooled by passing through the evaporator 27 when a request is made to cool the vehicle passenger compartment. Alternatively, interior air flow 5 can be heated by passing through the radiator 25 when a request is made to heat the vehicle passenger compartment. The ventilation, heating and/or air-conditioning system can also be used to dehumidify the interior air flow 5. In this configuration, the refrigerant circulates in the radiator 25 and in the evaporator 27. The moist interior air flow thus first passes through the evaporator 27, where it is cooled and partially condensed. The condensation formed is retained in the evaporator 27, for example, while the dry interior air flow 5 passes through the radiator 25 in order to be heated there. In this way, the interior air flow 5 is thus warm and dry when it is sent to the passenger compartment of the vehicle.

The second path 22 is arranged parallel to the first path 21 and comprises a first heat exchanger 12, and also a second expansion member 43 arranged between the junction zone 45 and the first heat exchanger 12. The second expansion member 43 expands the refrigerant before the latter passes through the first heat exchanger 12. The first heat exchanger 12 performs a heat exchange between the refrigerant circulating in the second path 22 and the heat transfer fluid circulating in the heat transfer fluid circuit 3. As will be described in detail below, the heat transfer fluid circuit 3 is used in particular to thermally treat the electrical or electronic components of the vehicle. The refrigerant thus participates in the thermal treatment of these electrical or electronic components by interacting thermally with the heat transfer fluid, in particular via the first heat exchanger 12. Thus, when the refrigerant circulating in the second path 22 is expanded by the second expansion member 43, and subsequently passes through the first heat exchanger 12, the heat transfer fluid also passing through the first heat exchanger 12 in the heat transfer fluid circuit 3 is cooled by the refrigerant. This heat exchange also helps to evaporate the refrigerant.

Both the first path 21 and the second path 22 end at the first convergence zone 48, where the main path 20 begins. The latter also comprises an accumulation device 7, arranged between the first convergence zone 48 and the compression device 6. Since the latter can only compress refrigerant in the gaseous state, the accumulation device 7 is arranged upstream of the compression device 6 in order to retain a potential fraction of refrigerant that has not been evaporated during circulation within the refrigerant circuit 2. The accumulation device 7 thus ensures that the refrigerant flowing through the compression device 6 is entirely in the gaseous state, since the passage of refrigerant in the liquid state through the compression device 6 could damage the latter.

The refrigerant circuit 2 also comprises a third path 23, which starts at a first divergence zone 46 and ends at the junction zone 45. The first divergence zone 46 is disposed on the main path 20, between the radiator 25 and the first expansion device 41. In this way, the third path 23 makes it possible in particular to bypass the evaporator/condenser 26.

The third path 23 comprises a second heat exchanger 13 and a second expansion device 44 disposed between the first divergence zone 46 and the second heat exchanger 13. Like the first expansion device 41, the second expansion device 44 is designed to allow the refrigerant to pass through without affecting its pressure, or to expand the refrigerant to a greater or lesser extent. The second heat exchanger 13, like the first heat exchanger 12, exchanges heat between the refrigerant and the heat transfer fluid circulating in the heat transfer fluid circuit 3. Depending on the thermal treatment to be applied in the heat transfer fluid circuit 3, the second expansion device 44 can expand the refrigerant circulating in the third path 23 to a greater or lesser extent. It is then possible to determine the temperature of the refrigerant flowing through the second heat exchanger 13, and to deduce at what temperature the heat transfer fluid exits the second heat exchanger 13 once the heat exchange between the refrigerant and the heat transfer fluid has taken place. The level of expansion of the refrigerant by the second expansion device 44 therefore depends on the thermal treatment requirements of the electrical or electronic components to be satisfied by the heat transfer fluid.

The refrigerant circuit 2 also comprises a fourth path 24, which starts at a second divergence zone 47 and ends at a second convergence zone 49. The first divergence zone 47 is disposed on the main path 20, between the evaporator/condenser 26 and the junction zone 45, while the second convergence zone 49 is disposed on the main path 20, between the first convergence zone 48 and the accumulation device 7. The fourth path 24 thus enables the refrigerant circulating through it to bypass the first path 21 and the second path 22. The fourth path 24 comprises a valve 65 which controls the circulation of refrigerant in the fourth path 24.

In order to prevent refrigerant from circulating in the refrigerant circuit 2 in an undesired direction, the refrigerant circuit 2 comprises a plurality of check valves. A first check valve 66 is disposed on the first path 21, between the evaporator 27 and the first convergence zone 48, and prevents refrigerant circulating in the second path 22 from circulating in the first path 21 once it reaches the first convergence zone 48. A second check valve 67 is disposed on the main path 20, between the second divergence zone 47 and the junction zone 45, and prevents refrigerant circulating in the third path 23 from circulating in the main path 20 once it reaches the junction zone 45. Lastly, a third check valve 68 is located on the fourth path 24, between the valve 65 and the second convergence zone 49, and prevents refrigerant circulating into the main path 20 from the first convergence zone 48 from circulating into the fourth path 24 once it reaches the second convergence zone 49.

The heat transfer fluid circuit 3 comprises a main branch 30 equipped with a first pump 8 for circulating the heat transfer fluid within the heat transfer fluid circuit 3. The main branch 30 comprises a first heat exchanger 35 configured to perform a heat exchange between the heat transfer fluid and an electric motor 10 of the vehicle. This motor is particularly likely to generate heat when the vehicle is in operation, and must therefore be thermally treated to prevent damage, for example due to excessive temperature.

The main branch 30 also comprises a second heat exchanger 36, which is configured to perform a heat exchange between the heat transfer fluid and the exterior air flow 4. Like the evaporator/condenser 26, the second heat exchanger 36 can therefore be arranged on the front face of the vehicle so as to be positioned in line with a trajectory of the exterior air flow 4.

The main branch 30 also comprises a second pump 9 which, like the first pump 8, ensures circulation of the heat transfer fluid. The main branch 30 also comprises a third heat exchanger 37 configured to perform a heat exchange between the heat transfer fluid and an electrical storage element 11. Like the electric motor 10, the electrical storage element 11 must be heat-treated to prevent damage and/or ensure optimal operation.

The heat transfer fluid circuit 3 also comprises a first branch 31, a second branch 32 and a third branch 33, all three arranged in parallel with one another and all three extending specifically between two points disposed on the main branch 30.

The first branch 31 extends between a first junction point 51 and a second junction point 52, and comprises the first heat exchanger 12. The heat transfer fluid circulating in the first branch 31 thus interacts within the first heat exchanger 12 with the refrigerant circulating in the second path 22. The first junction point 51 is disposed on the main branch 30, between the second heat exchanger 36 and the second pump 9. The second junction point 52 is disposed on the main branch 30, between the third heat exchanger 37 and the first pump 8.

The second branch 32 runs parallel to the first branch 31 between a first divergence point 53 and a first convergence point 56. The first divergence point 53 is disposed on the main branch 30, between the second heat exchanger 36 and the first junction point 51, while the first convergence point 56 is disposed on the main branch 30, between the second junction point 52 and the first pump 8. As the second branch 32 is not provided with any heat exchanger, any heat transfer fluid circulating in the second branch 32 does not undergo any thermal treatment.

The third branch 33 runs parallel to the first branch 31 and the second branch 32, between a second divergence point 54 and a second convergence point 57. The second divergence point 54 is disposed on the main branch 30, between the third heat exchanger 37 and the second junction point, while the second convergence point 57 is disposed on the main branch 30, between the first junction point 51 and the first pump 9. The third branch 33 comprises the second heat exchanger 13 mentioned above. The heat transfer fluid circulating in the third branch 33 thus interacts within the second heat exchanger 13 with the refrigerant circulating in the third path 23. The third branch 33 can also comprise an electrical heating element 38, arranged between the second divergence point 54 and the second heat exchanger 13, in order to increase the temperature of the heat transfer fluid if such a temperature increase is not possible via the heat exchange performed within the second heat exchanger 13.

The heat transfer fluid circuit 3 also comprises a bypass device 14, the function of which is to determine the circulation of heat transfer fluid within the heat transfer fluid circuit 3. The bypass device 14 comprises a first valve 61 arranged on the main branch 30, between the first junction point 51 and the first divergence point 53, and makes it possible to control the circulation of heat transfer fluid between these two points. The bypass device 14 also comprises a second valve 62 disposed on the second branch 32 and a third valve 63 disposed on the second divergence point 54. The second valve 62 makes it possible to control the circulation of heat transfer fluid within the second branch 32. The third valve 63 can take the form of a three-way valve making it possible to direct the heat transfer fluid circulating through the main branch 30 at the outlet of the third heat exchanger 37 towards the third branch 33, or to direct the heat transfer fluid so that it continues to circulate through the main branch 30.

The valves forming the bypass device 14 thus enable the heat transfer fluid circuit 3 to be separated into two distinct loops within which the heat transfer fluid circulates, each of these loops being dedicated to the thermal treatment of the electric motor 10 or electrical storage element 11. The presence of the two pumps 8, 9 thus ensures the circulation of the refrigerant, even if the heat transfer fluid circuit 3 is separated into two loops by the bypass device.

As will be seen later, the heat transfer fluid circuit 3 can be divided into a first loop comprising a first portion of the main branch 30, said first portion being provided with at least the first pump 8, the first heat exchanger 35 and the second heat exchanger 36, and one of the first branch 31 or the second branch 32, and a second loop comprising a second portion of the main branch 30, said second portion being provided with at least the second pump 9 and the third heat exchanger 37, and one of the first branch 31 and the third branch 33. It is noted that when one of the loops comprises the first branch 31, then the other loop does not include said first branch 31. The two loops are therefore determined by the bypass device 14, depending on the thermal treatment requirements of the electric motor 10 or electrical storage element 11.

The heat transfer fluid circuit 3 also includes a bypass branch 34 starting at a third divergence point 55 disposed on the main branch 30, between the first heat exchanger 35 and the second heat exchanger 36, and ending at a third convergence point 58 disposed on the main branch 30, between the second heat exchanger 36 and the first divergence point 53. In other words, the bypass branch 34 enables the heat transfer fluid to bypass the second heat exchanger 36. Bypassing the second heat exchanger 36 prevents the heat transfer fluid from losing pressure as it passes through the second heat exchanger 36. Such bypassing is therefore useful when it is not necessary to perform a heat exchange between the heat transfer fluid and the exterior air flow 4. The circulation of the heat transfer fluid within the bypass branch 34 can, for example, be controlled by a fourth valve 64 disposed on the third divergence point 55. The fourth valve 64 can, for example, be a three-way valve making it possible to direct the heat transfer fluid to the bypass branch 34 or to the second heat exchanger 36 as required.

The heat transfer fluid circuit 3 also comprises a set of flaps 19 arranged opposite the second heat exchanger 36 and in the path of the exterior air flow 4. The flaps 19 are able to rotate on themselves and switch between an open position allowing the exterior air flow 4 to pass through the second heat exchanger 36, and a closed position preventing the exterior air flow 4 from passing through the second heat exchanger 36.

When it is not essential to perform a heat exchange with the exterior air flow 4, the flaps 19 can be tilted to the closed position to prevent the exterior air flow 4 from passing through. When the exterior air flow does not pass through the front of the vehicle, the latter has a better air penetration coefficient when in motion, and vehicle fuel consumption is therefore reduced. It is therefore advantageous to close the flaps 19 whenever possible.

Figure 2:
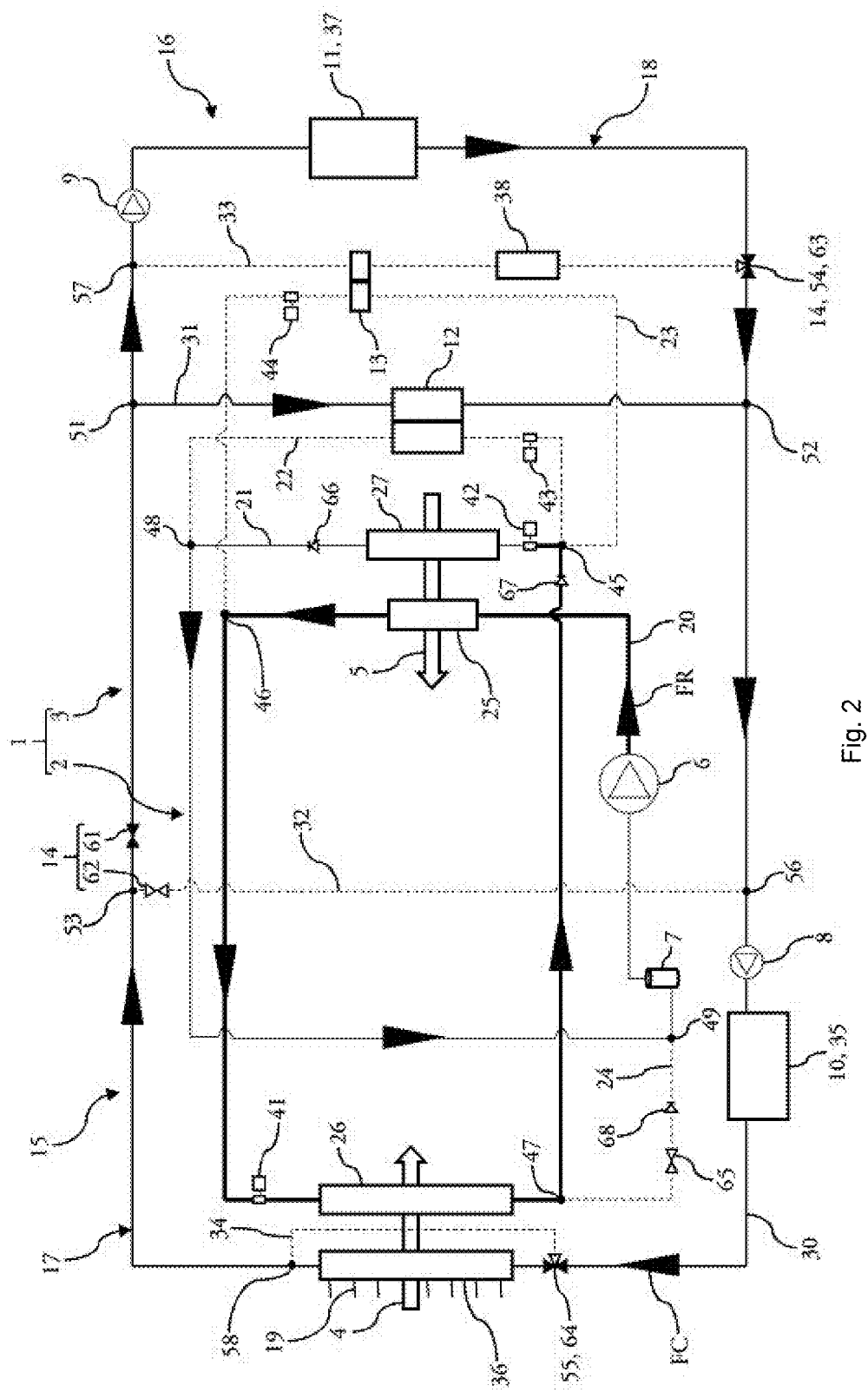
FIG. 2 is a schematic diagram of the thermal treatment system according to the invention illustrating a circulation of a refrigerant within the refrigerant circuit and of a heat transfer fluid within the heat transfer fluid circuit according to a first operating mode of the thermal treatment system.

FIG. 2 shows the circulation of the refrigerant FR and the heat transfer fluid FC within their respective circuits in a first operating mode of the thermal treatment system 1. In this first operating mode, the vehicle passenger compartment is cooled, and the electric motor 10 and electrical storage element 11 are cooled. In this and subsequent figures, only the circulations of the various fluids will be described. Reference should be made to the description of FIG. 1 for a structural description of the refrigerant circuit 2 and the heat transfer fluid circuit 3.

In the refrigerant circuit 2, the refrigerant FR is compressed and circulated by the compression device 6, the refrigerant FR circulates within the main path 20 and passes through the radiator 25. Thanks to the guiding means of the ventilation, heating and/or air-conditioning system, the interior air flow 5 bypasses the radiator and is therefore not heated by the refrigerant FR.

The refrigerant FR continues to circulate in the main path 20 and passes through the first expansion device 41, which allows the refrigerant FR to pass through without expanding it. The refrigerant FR then passes through the evaporator/condenser 26, which acts as a condenser, and the refrigerant FR is therefore at least partially condensed by the exterior air flow 4.

On leaving the evaporator/condenser 26, the refrigerant FR circulates in the main path 20 to the junction zone 45, then continues to circulate in the first path 21, where it is expanded by the first expansion member 42 to pass through the low-temperature evaporator 27. The interior air flow 5 circulates through the evaporator 27 and is thus cooled by the refrigerant FR. The interior air flow 5 is then sent into the vehicle passenger compartment to cool it.

At the outlet of the evaporator 27, the refrigerant FR is at least partially evaporated as a result of the heat exchange produced in the evaporator 27. The refrigerant FR continues to circulate in the first path 21, then rejoins the main path 20 via the first convergence zone 48. The refrigerant FR then passes through the accumulation device 7, where a potential fraction of refrigerant FR in the liquid state is retained, before being compressed again by the compression device 6.

In the heat transfer fluid circuit 3, the heat transfer fluid FC is circulated in a first thermal treatment mode of a heat transfer fluid circuit 3 management process. As a result, the heat transfer fluid FC circulates entirely within the main branch 30. For this first operating mode, the bypass device 14 therefore does not separate the heat transfer fluid circuit 3 into two separate loops. The first valve 61 is then open, the second valve 62 is closed, and the third valve 63 keeps the heat transfer fluid FC within the main branch.

The heat transfer fluid FC is therefore circulated by the first pump 8 and/or by the second pump 9. Since, in FIG. 2, the heat transfer fluid FC circulates only in a single loop, one of the two pumps 8, 9 is sufficient to circulate the heat transfer fluid FC. Advantageously, however, both pumps 8, 9 can be activated simultaneously, so as to distribute the effort of circulating the heat transfer fluid FC between the two pumps 8, 9.

According to FIG. 2, the heat transfer fluid FC passes through the first heat exchanger 35 to perform a heat exchange with the electric motor 10, the second heat exchanger 36 to perform a heat exchange with the exterior air flow 4, and the third heat exchanger 37 to perform a heat exchange with the electrical storage element 11.

In this first operating mode, the electric motor 10 and the electrical storage element 11 are at a moderate temperature. As a result, the heat transfer fluid FC passes through the second heat exchanger 36 in such a way that all the calories captured by the heat transfer fluid FC as it passes through the first heat exchanger 35 and the third heat exchanger 37 is dissipated by the exterior air flow 4 during the heat exchange taking place within the second heat exchanger 36. As a result, the fourth valve 64 directs the heat transfer fluid FC to the second heat exchanger 36. The flaps 19 are open so that the exterior air flow 4 can circulate within the front of the vehicle, specifically in order to capture the calories from the heat transfer fluid FC as it passes through the second heat exchanger 36 and to condense the refrigerant FR as it passes through the evaporator/condenser 26.

In such a configuration, the heat transfer fluid FC can potentially circulate within the first branch 31 and can thus pass through the first heat exchanger 12 without effect, as the refrigerant FR does not circulate in the second path 22.

Figure 3:
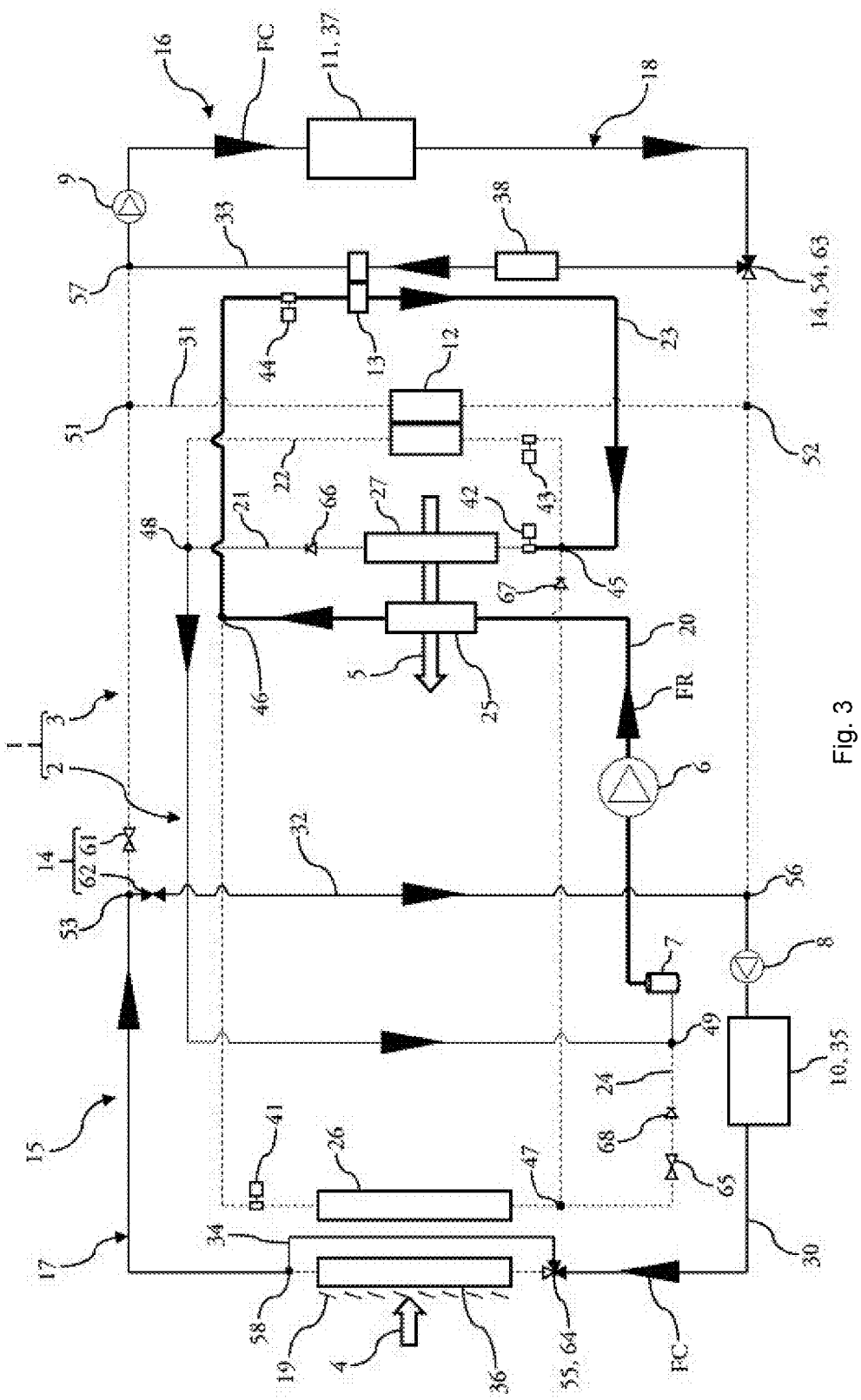
FIG. 3 is a schematic diagram of the thermal treatment system according to the invention illustrating the circulation of the refrigerant within the refrigerant circuit and of the heat transfer fluid within the heat transfer fluid circuit according to a second operating mode of the thermal treatment system.

FIG. 3 shows the circulation of the refrigerant FR and the heat transfer fluid FC within their respective circuits in a second operating mode of thermal treatment system 1. In this second operating mode, the vehicle passenger compartment is cooled or dehumidified via the refrigerant circuit 2, with the exclusive support of the heat transfer fluid circuit 3.

In the refrigerant circuit 2, the refrigerant FR is circulated according to a cooling mode of the vehicle passenger compartment of a control method of the refrigerant circuit 2. The refrigerant FR is compressed and circulated by the compression device 6, the refrigerant FR circulates within the main path 20 and passes through the radiator 25.

Unlike the first operating mode, the refrigerant FR then circulates through the third branch 23 via the first divergence zone 46 and is condensed in the second heat exchanger 13 and not in the evaporator/condenser 26. The heat transfer fluid FC circulating in the third branch 33 is used to condense the refrigerant FR. The second expansion device 44 allows the refrigerant FR to pass through without being expanded.

The refrigerant FR continues to circulate in the third path 23 and joins the junction zone 45, then circulates in the first path 21 in order to be expanded by the first expansion member 42 and to pass through the evaporator 27 at low temperature. The interior air flow 5 is thus cooled by the refrigerant FR as it passes through the evaporator 27. If the purpose is to cool the vehicle passenger compartment, then the interior air flow 5 bypasses the radiator 25. If the purpose is to dehumidify the vehicle passenger compartment, then the interior air flow 5 also passes through the radiator 25. On leaving the evaporator 27, the refrigerant FR joins the main path 20, then passes through the accumulation device 7 before being compressed again by the compression device 6.

In the heat transfer fluid circuit 3, the bypass device 14 separates the circuit into two separate loops. The first valve 61 is then closed, the second valve 62 is open, and the third valve 63 directs the heat transfer fluid FC to the third branch 33. The first loop 15 thus comprises the first portion 17 of the main branch 30 and the second branch 32, while the second loop 16 comprises the second portion 18 of the main branch 30 and the third branch 33. In the second operating mode, the first branch 31 therefore is not used. Such a configuration corresponds to a first thermal treatment step of the electric motor 10, said step relating to a second thermal treatment mode. In contrast to the first thermal treatment mode, the second thermal treatment mode separates the heat transfer fluid circuit 3 into two loops 15, 16. The first thermal treatment step of the electric motor 10 means that the first loop 15 comprises the second branch 32.

Within the first loop 15, the heat transfer fluid FC is circulated by the first pump 8 and passes through the first heat exchanger 35, then is directed into the bypass branch 34 via the fourth valve 64. The heat transfer fluid FC continues to circulate in the first portion 17, then circulates through the second branch 32 before returning to the first pump 8.

The first loop 15 therefore thermally treats the electric motor 10 via the first heat exchanger 35 without the calories being dissipated by the exterior air flow 4 at the second heat exchanger 36, the latter being bypassed. This configuration, combined with the fact that the refrigerant FR is not condensed by the evaporator/condenser 26 in this second operating mode, means that the flaps 19 can be kept in the closed position to enhance the vehicle's aerodynamics and reduce fuel consumption. On the other hand, this leads to a gradual rise in the temperature of the electric motor 10 and of the heat transfer fluid FC. If the temperature of the latter becomes too high, it is then possible to open the flaps 19, modify the position of the fourth valve 64, and circulate the heat transfer fluid FC within the second heat exchanger 36 so that the exterior air flow 4 dissipates the calories from the heat transfer fluid FC.

In the second loop 16, the heat transfer fluid FC is circulated by the second pump 9 through the third heat exchanger 37. The heat transfer fluid FC then circulates to the second divergence point 54, where the third valve 63 directs the heat transfer fluid FC into the third branch 33. The heat transfer fluid FC then passes through the second heat exchanger 13 and picks up the calories from the refrigerant FR circulating in the third branch 23 in order to take part in the condensation of the latter. On leaving the second heat exchanger 13, the heat-transfer fluid FC returns to the second pump 9.

In addition to condensing the refrigerant FR circulating in the third path 23 thanks to the heat exchange within the second heat exchanger 13, the second loop 16 makes it possible to heat the electrical storage element 11. The heat transfer fluid FC is heated by capturing the calories of the refrigerant FR in the second heat exchanger 13, then circulates through the third heat exchanger 37 at a relatively high temperature. The heat transfer fluid FC thus makes it possible to heat the electrical storage element 11. This thus reduces the latter's internal resistance and improves the overall efficiency of the vehicle's powertrain. The second operating mode of the thermal treatment system 1 can then continue as long as the temperature of electrical storage element 11 remains acceptable.

Figure 4:
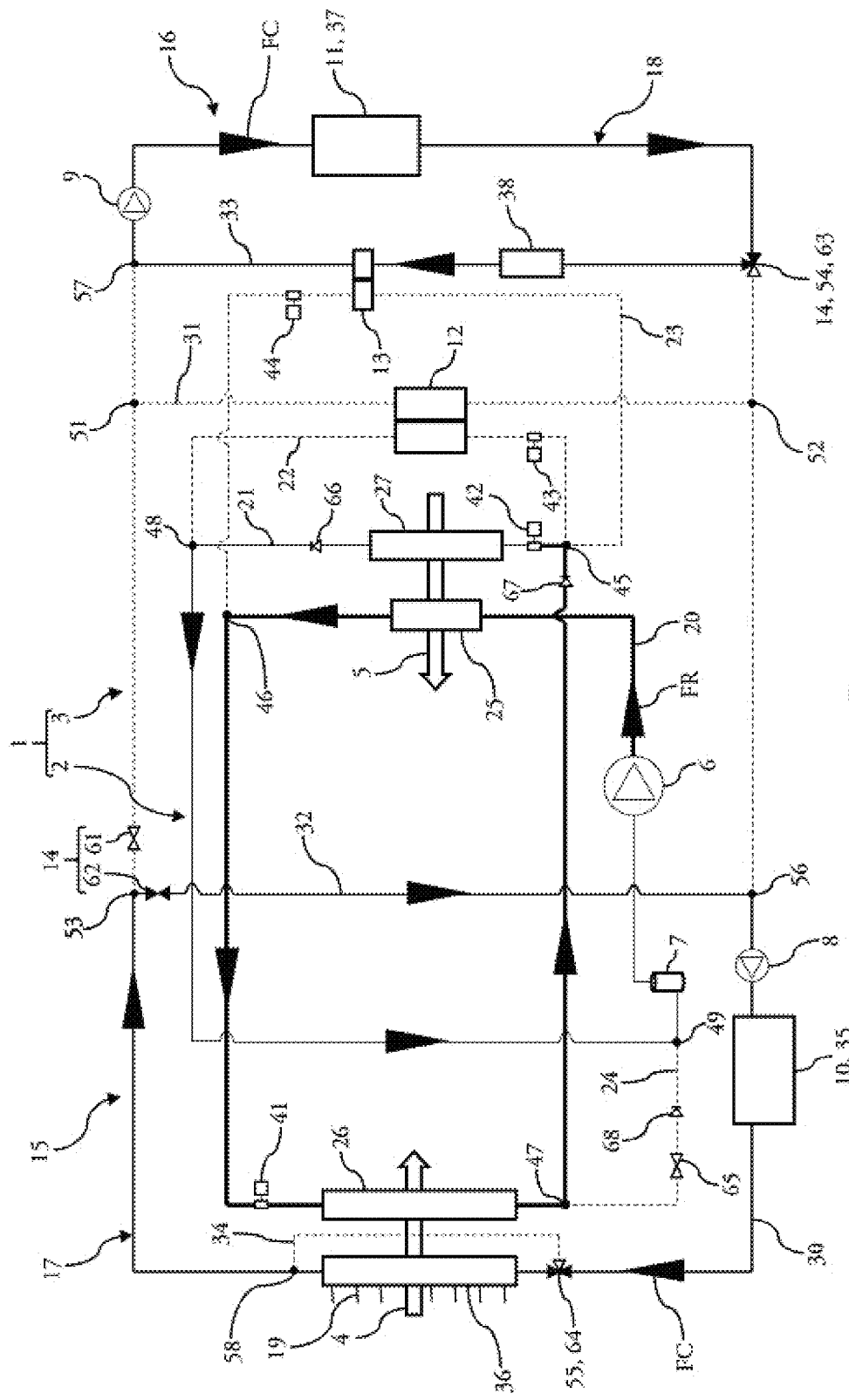
FIG. 4 is a schematic diagram of the thermal treatment system according to the invention illustrating the circulation of the refrigerant within the refrigerant circuit and of the heat transfer fluid within the heat transfer fluid circuit according to a third operating mode of the thermal treatment system.

FIG. 4 shows the circulation of the refrigerant FR and the heat transfer fluid FC within their respective circuits in a third operating mode of the thermal treatment system 1. This third operating mode, like the second operating mode, consists of cooling the vehicle passenger compartment or dehumidifying the vehicle passenger compartment via the refrigerant circuit 2. However, unlike the second operating mode, the electrical storage element 11 is at too high a temperature for the refrigerant FR to be condensed via the second heat exchanger 13.

As in the first operating mode of the thermal treatment system 1, the refrigerant FR must therefore be condensed by the exterior air flow 4 as it passes through the evaporator/condenser 26. The circulation of the refrigerant FR within the refrigerant circuit 2 is therefore identical to that illustrated in FIG. 2. As with the second operating mode, the interior air flow 5 is cooled by passing through the evaporator 27, and bypasses the radiator 25 if the objective is to cool the vehicle passenger compartment, or passes through the radiator 25 if the objective is to dehumidify the vehicle passenger compartment.

The first loop 15 and the second loop 16 of the heat transfer fluid circuit 3 are identical to those shown in FIG. 3. The heat transfer fluid FC is therefore always circulated according to the first thermal treatment step of the electric motor 10. Reference should be made to the description of FIG. 3 with regard to a description of the circulation of heat transfer fluid FC within the two loops 15, 16.

The flaps 19 are in the open position to allow the exterior air flow 4 to pass through, so that it can condense the refrigerant FR circulating within the evaporator/condenser 26. The exterior air flow 4 can therefore also dissipate the calories from the heat transfer fluid FC circulating in the first loop 15 if necessary, for example if the heat transfer fluid FC is at too high a temperature to properly thermally treat the electric motor 10. The flaps 19 can also be temporarily switched to the closed position to defrost the evaporator/condenser 26 by circulating the refrigerant FR alone at high pressure.

Figure 5:
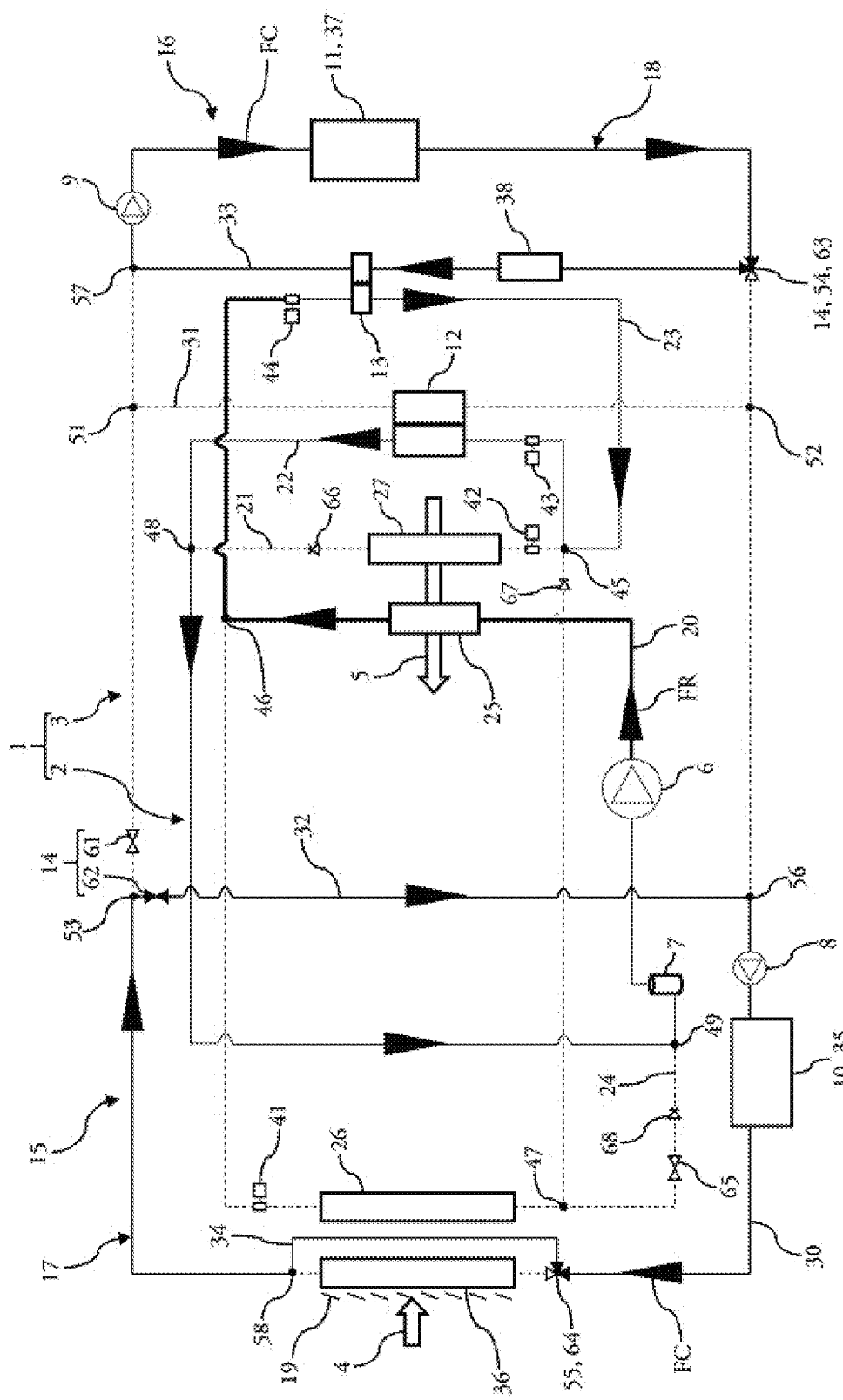
FIG. 5 is a schematic diagram of the thermal treatment system according to the invention illustrating the circulation of the refrigerant within the refrigerant circuit and of the heat transfer fluid within the heat transfer fluid circuit according to a fourth operating mode of the thermal treatment system.

FIG. 5 shows the circulation of the refrigerant FR and the heat transfer fluid FC within their respective circuits in a fourth operating mode of the thermal treatment system 1. This fourth operating mode consists of heating the vehicle passenger compartment while cooling the electrical storage element 11. Such an operating mode is therefore recommended when the electrical storage element 11 has reached a high temperature, for example following rapid recharging of said electrical storage element 11.

The refrigerant FR is circulated by the compression device 6 and passes through the radiator 25. The interior air flow 5 is thus heated by the high-pressure refrigerant FR as it passes through the radiator 25 before being directed into the vehicle passenger compartment to heat it.

Once it reaches the first divergence zone 46, the refrigerant FR circulates through the third path 23 to the second expansion device 44. In contrast to the second operating mode, the second expansion device 44 expands the refrigerant FR, so that it passes through the second heat exchanger 13 at low temperature. This expansion of the refrigerant FR takes place in order to cool the heat transfer fluid FC circulating in the third branch 33 and passing through the second heat exchanger 13. This configuration corresponds to a vehicle passenger compartment heating mode. More specifically, said configuration corresponds to a step of cooling the heat transfer fluid FC during heating of the vehicle passenger compartment.

The refrigerant FR then circulates to the junction zone 45 and circulates in the second path 22 without being expanded by the second expansion member 43 or undergoing heat exchange within the first heat exchanger 12, the aim being solely to join the main path 20. Having done this, the refrigerant FR passes through the accumulation device 7 and is compressed again by the compression device 6.

The heat transfer fluid FC circulating in the first loop 15 and in the second loop 16 circulates in the same way as described in FIGS. 3 and 4, still according to the first thermal treatment step of the electric motor 10. As already mentioned, the main purpose of this fourth operating mode is to cool the electrical storage element 11. Within the second loop 16, the heat transfer fluid FC is therefore driven by the second pump 9 in order to cool the electrical storage element 11 by passing through the third heat exchanger 37. On leaving the latter, the heat transfer fluid FC circulates through the third branch 33 and is cooled by the refrigerant FR in the second heat exchanger 13, as described above. The cooled heat transfer fluid FC can then flow back through the third heat exchanger 37 to cool the electrical storage element 11.

If the electrical storage element 11 is at high temperature following rapid recharging, the electric motor 10 is at ambient temperature. The structure of the first loop 15 is therefore identical to that described in FIGS. 3 and 4. As in the second operating mode, the flaps 19 are preferably in the closed position to promote the aerodynamics of the vehicle, and the heat transfer fluid FC circulating in the first loop 15 circulates via the bypass branch 34.

Figure 6:
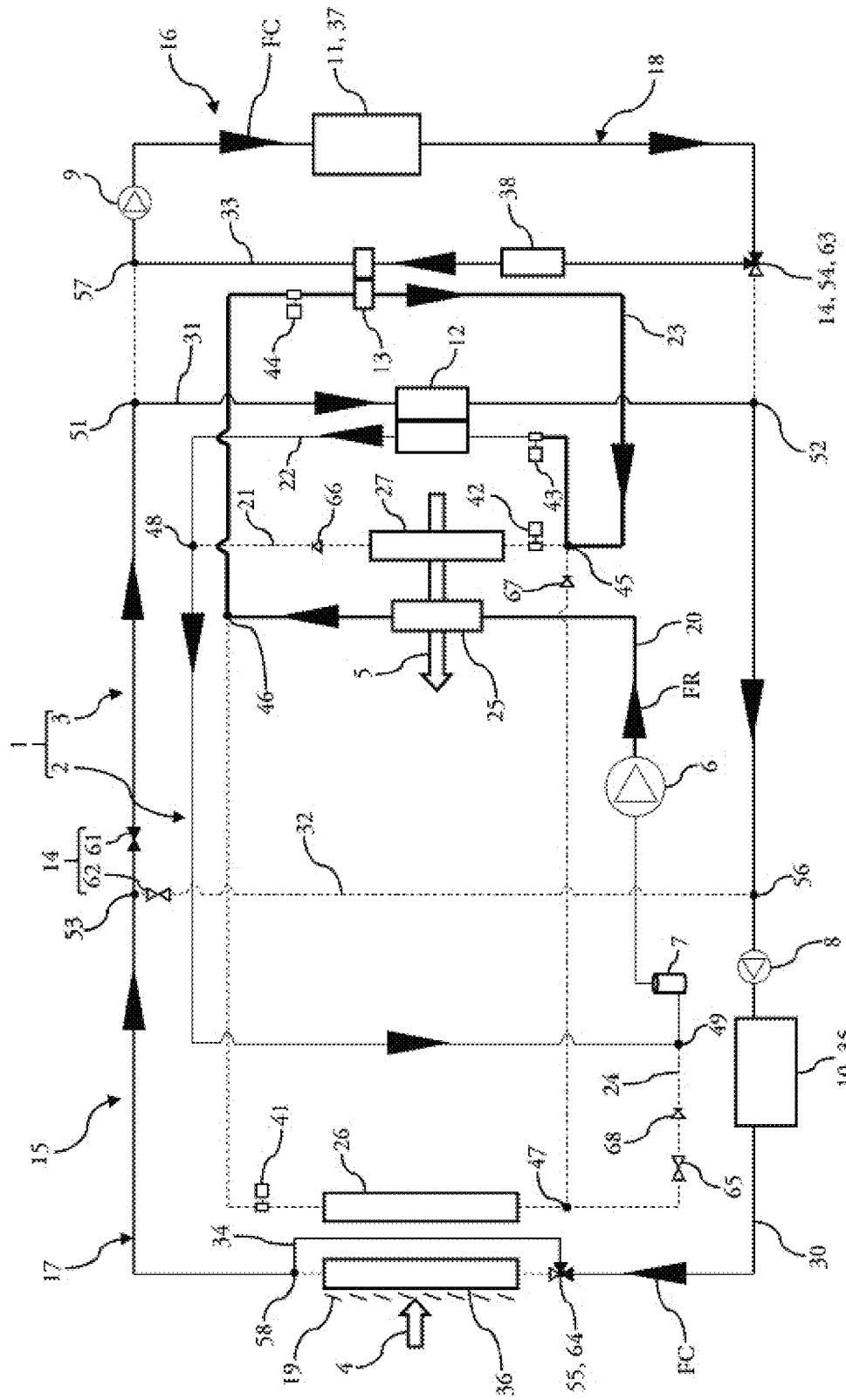
FIG. 6 is a schematic diagram of the thermal treatment system according to the invention illustrating the circulation of the refrigerant within the refrigerant circuit and of the heat transfer fluid within the heat transfer fluid circuit according to a fifth operating mode of the thermal treatment system.

FIG. 6 shows the circulation of the refrigerant FR and of the heat transfer fluid FC within their respective circuits in a fifth operating mode of the thermal treatment system 1. This fifth operating mode consists of heating the vehicle passenger compartment while cooling the heat engine 10 and while heating the electrical storage element 11.

For this fifth operating mode of the thermal treatment system 1, as well as for the operating modes described hereinafter, the bypass device 14 is configured so that the first loop 15 of the heat transfer fluid circuit 3 consists of the first portion 17 of the main branch 30 and the first branch 31, in contrast to the operating modes illustrated in FIGS. 3 to 5 where the heat transfer fluid FC of the first loop 15 circulated within the second branch 32. As a result, the first valve 61 is open and the second valve 62 is closed. The second loop 16 remains unchanged. The position of the third valve 63 therefore remains unchanged from that described above. Such a configuration corresponds to a second thermal treatment step for the electric motor 10, said step relating to the second thermal treatment mode of the management process of the heat transfer fluid circuit 3. The second thermal treatment step of the electric motor 10 means that the first loop 15 comprises the first branch 31.

The refrigerant FR circulates within the refrigerant circuit 2 according to a heating step of the heat transfer fluid FC during the heating of the vehicle passenger compartment, according to the control process of the refrigerant circuit 2. As a result, the refrigerant FR is circulated by the compression device 6 and passes through the radiator 25. The interior air flow 5 is thus heated by the high-pressure refrigerant FR as it passes through the radiator 25 before being directed into the vehicle passenger compartment to heat it.

Once it reaches the first divergence zone 46, the refrigerant FR circulates through the third path 23 to the second expansion device 44. The latter allows the refrigerant FR to circulate without expanding it. The refrigerant FR passes through the second high-pressure heat exchanger 13 to transfer its calories to the heat transfer fluid FC circulating in the third branch 33. The heat transfer fluid FC then exits the second heat exchanger 13 at a higher temperature, in order to circulate through the third heat exchanger 37 and heat the electrical storage element 11. This reduces the latter's internal resistance and improves the overall efficiency of the vehicle's powertrain.

On leaving the second heat exchanger 13, the refrigerant FR continues to circulate in the third path 23, reaches the junction zone 45, and then circulates in the second path 22. The refrigerant FR is then expanded by the second expansion member 43 and passes through the first heat exchanger 12 at low pressure, in order to cool the heat transfer fluid FC circulating in the first branch 31.

On leaving the first heat exchanger 12, the refrigerant FR joins the main path 20 and then passes through the accumulation device 7 before being compressed again by the compression device 6.

In the first loop 15 of the heat transfer fluid circuit 3, the aim is to cool the electric motor 10. The latter can reach a high temperature, for example when the vehicle is travelling at high speed on a freeway. The heat transfer fluid FC is therefore circulated within the first loop 15 by the first pump 8 and captures the calories from the electric motor 10 by passing through the first heat exchanger 35. The heat transfer fluid FC then circulates within the first branch 31 and is cooled within the first heat exchanger 12 by the refrigerant FR circulating within the second path 22 and also passing through the first heat exchanger 12. Once cooled, the heat transfer fluid FC returns to the first pump 8 and can then cool the heat engine 10 by passing through the first heat exchanger 35 once again.

The cooling of the heat transfer fluid FC within the first heat exchanger 12, and the fact that the refrigerant does not circulate via the evaporator/condenser 26, enables the flaps 19 to tilt into the closed position to prevent the circulation of the exterior air flow 4 and promote the aerodynamics of the vehicle. The heat transfer fluid FC can also bypass the second heat exchanger 36 by circulating through the bypass branch 34 via the fourth valve 64.

Figure 7:
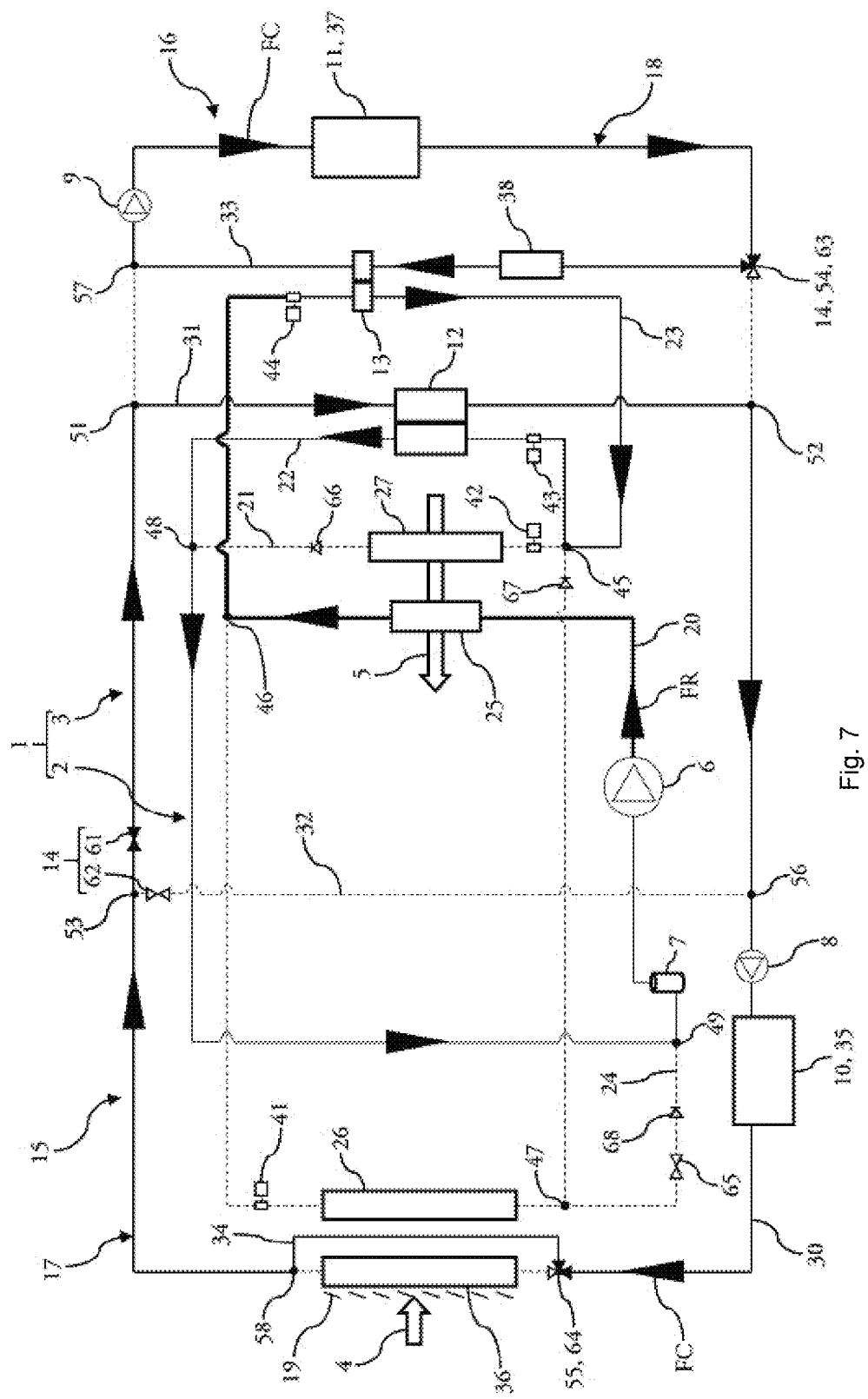
FIG. 7 is a schematic diagram of the thermal treatment system according to the invention illustrating the circulation of the refrigerant within the refrigerant circuit and of the heat transfer fluid within the heat transfer fluid circuit according to a sixth operating mode of the thermal treatment system.

FIG. 7 shows the circulation of the refrigerant FR and of the heat transfer fluid FC within their respective circuits in a sixth operating mode of the thermal treatment system 1. This sixth operating mode consists of heating the vehicle passenger compartment while cooling the heat engine 10 and the electrical storage element 11.

Compared with the fifth operating mode described in FIG. 6, the circulation of refrigerant FR and heat transfer fluid FC is exactly the same. As a result, the second thermal treatment step for the electric motor 10 is always carried out within the heat transfer fluid circuit 3. For the features common to the fifth and sixth operating modes, reference can thus be made to the description of FIG. 6. The difference between the sixth operating mode and the fifth operating mode is that the electrical storage element 11 must be cooled rather than heated.

Thus, only the function of the second expansion device 44 differs from the fifth operating mode. In other words, the refrigerant FR circulates in the refrigerant circuit 2 during the step of cooling of the heat transfer fluid FC. The second expansion device 44 will then expand the refrigerant FR to an intermediate pressure in order to cool the refrigerant FR before it passes through the second heat exchanger 13. With the refrigerant FR at intermediate pressure, the heat transfer fluid FC circulating in the third branch 33 is then cooled, rather than heated as described in FIG. 6. The cooled heat transfer fluid FC can then circulate to the third heat exchanger 37 to cool the electrical storage element 11.

The refrigerant FR then circulates through the second path 22 and is expanded by the second expansion member 43 to pass from intermediate pressure to low pressure, in order to cool the heat transfer fluid FC circulating through the first branch 31 in the first heat exchanger 12. The cooled heat transfer fluid FC can then circulate to the first heat exchanger 35 to cool the electric motor 10.

Figure 8:
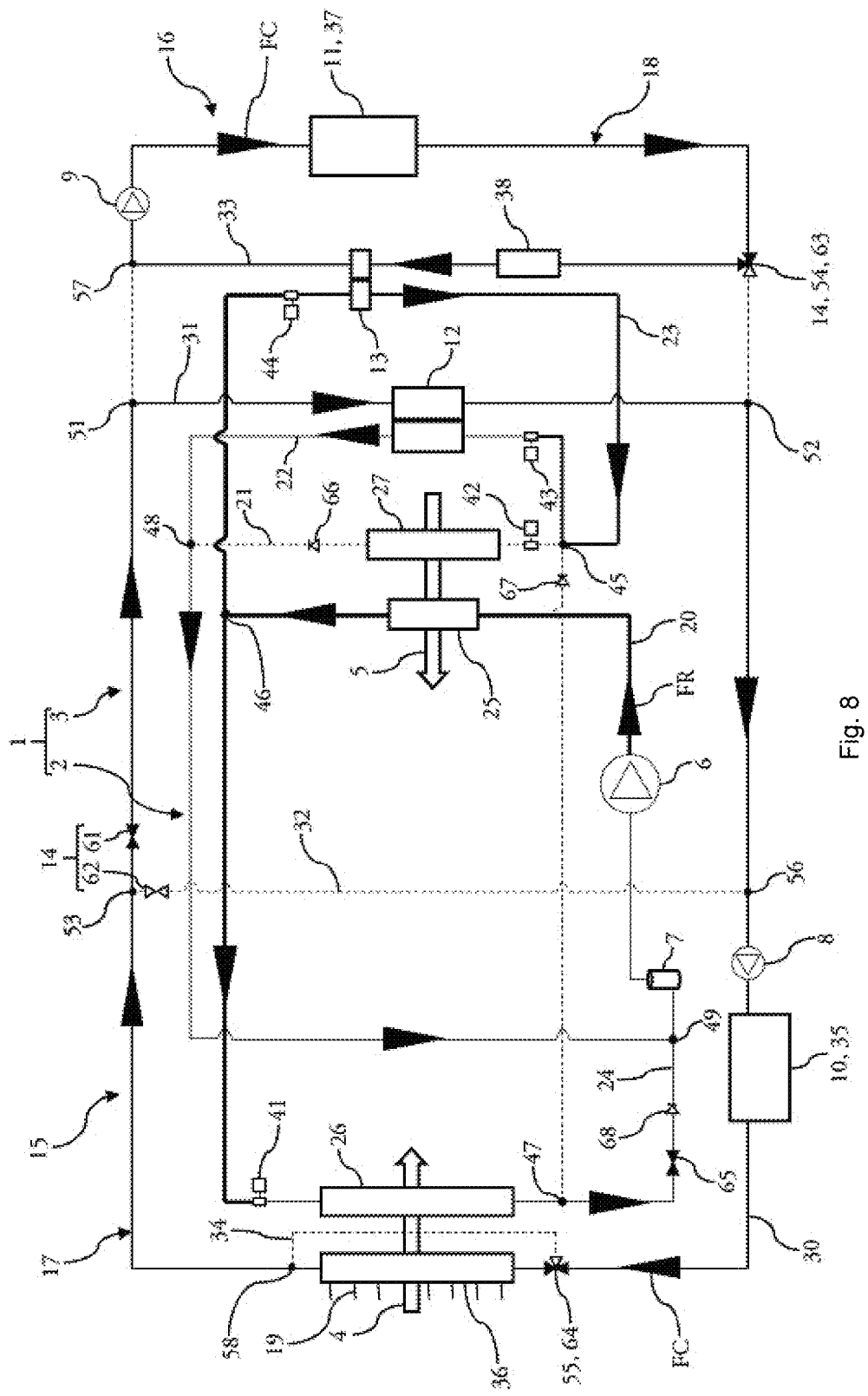
FIG. 8 is a schematic diagram of the thermal treatment system according to the invention illustrating the circulation of the refrigerant within the refrigerant circuit and of the heat transfer fluid within the heat transfer fluid circuit according to a seventh operating mode of the thermal treatment system.

FIG. 8 shows the circulation of the refrigerant FR and of the heat transfer fluid FC within their respective circuits in a seventh operating mode of the thermal treatment system 1. This seventh operating mode consists of heating the vehicle passenger compartment while cooling the heat engine 10 and while heating or cooling the electrical storage element 11. This seventh operating mode is used in cases where the fifth operating mode or the sixth operating mode is insufficient to cool the electric motor 10 effectively.

The refrigerant FR is circulated by the compression device 6 and passes through the radiator 25. The interior air flow 5 is thus heated by the high-pressure refrigerant FR as it passes through the radiator 25 before being directed into the vehicle passenger compartment to heat it.

At the first divergence zone 46, the refrigerant FR splits into two fractions. A first FR refrigerant fraction continues to circulate within the main path 20, while a second FR refrigerant fraction circulates within the third path 23.

The first fraction of refrigerant FR circulates to the first expansion device 41 and is expanded by the latter before passing through the evaporator/condenser 26, which acts as an evaporator. On leaving the evaporator/condenser 26, the refrigerant FR then circulates through the fourth path 24, with the valve 65 open, and joins the main path 20 directly via the second convergence zone 49, bypassing the first path 21 and the second path 22. The circulation of the first refrigerant fraction FR thus acts as a heat pump within the refrigerant circuit 2.

The second refrigerant fraction FR circulates through the third path 23 to the second expansion device 44, which expands the refrigerant FR to intermediate pressure in order to cool the heat transfer fluid FC within the second heat exchanger 13, as described in FIG. 7. In FIG. 8, the second expansion device 44 behaves in the same way as described in FIG. 7, since the aim is to cool the electrical storage element 11 via the heat transfer fluid FC. However, it is possible for the second expansion device 44 to behave identically to that described in FIG. 6 if the aim is to heat the electrical storage element. Such an alternative is not shown here. In other words, the refrigerant FR can be circulated during the cooling step of the heat transfer fluid FC as shown in FIG. 8, or during the heating step of the heat transfer fluid FC, while the vehicle passenger compartment is being heated.

The refrigerant FR then circulates through the second path 22 and is expanded by the second expansion member 43 to pass from intermediate pressure to low pressure, in order to cool the heat transfer fluid FC circulating through the first branch 31 in the first heat exchanger 12. The cooled heat transfer fluid FC can then circulate to the first heat exchanger 35 to cool the electric motor 10.

On leaving the first heat exchanger 12, the refrigerant FR then joins the main path 20 and passes through the accumulation device 7 before being compressed again by the compression device 6.

As in the fifth and sixth operating modes, the heat transfer fluid FC circulates in the second thermal treatment step of the electric motor 10. In order to improve cooling of the electric motor 10, in addition to being cooled by the first heat exchanger 12, the heat transfer fluid FC circulating in the first loop 15 also sheds calories by passing through the second heat exchanger 36, unlike in the fifth and sixth operating modes where the heat transfer fluid FC bypasses the second heat exchanger 36 via the bypass branch 34.

Thus, for this seventh operating mode, the flaps 19 are in the open position to allow the circulation of the exterior air flow 4 through the second heat exchanger 36 to at least partially dissipate the calories of the heat transfer fluid FC circulating in the first loop 15, as well as through the evaporator/condenser 26 to evaporate the refrigerant FR circulating within the evaporator/condenser 26.

The seven operating modes described above are not exhaustive, and other operating modes adapted to different situations can be implemented by the thermal treatment system 1 according to the invention.

Of course, the invention is not limited to the examples that have just been described and numerous modifications can be made to these examples without departing from the scope of the invention.

The invention, as has just been described, does indeed achieve its stated objective, and makes it possible to propose a refrigerant circuit that nevertheless makes it possible to ensure a discharge of calories of a refrigerant by virtue of a heat transfer fluid circuit. Variants that are not described here can be implemented without departing from the context of the invention, provided that, in accordance with the invention, they comprise a refrigerant circuit according to the invention.

What is claimed is:

1. A refrigerant circuit for a vehicle thermal treatment system, comprising:
   a main path starting at a first convergence zone and ending at a junction zone, the main path including:
   a compressor,
   a radiator configured to perform a heat exchange between the refrigerant and an interior air flow intended to be sent into a vehicle passenger compartment,
   an evaporator-condenser configured to perform a heat exchange between the refrigerant and an exterior air flow outside the vehicle passenger compartment, and
   an accumulation device,
   the refrigerant circuit further comprising a first path and a second path, both starting at the junction zone and ending at the first convergence zone,
   the first path including an evaporator configured to perform a heat exchange between the refrigerant and the interior air flow,
   the second path including a first heat exchanger configured to perform a heat exchange between the refrigerant and a heat transfer fluid circulating within a heat transfer fluid circuit of the vehicle,
   the refrigerant circuit further comprising a third path starting at a first divergence zone arranged on the main path between the radiator and the evaporator-condenser and ending at the junction zone, said third path including a second heat exchanger, positioned in parallel relative to the evaporator-condenser in the main path, configured to perform a heat exchange between the refrigerant and the heat transfer fluid of the heat transfer fluid circuit.

2. The refrigerant circuit as claimed in claim 1, wherein the first heat exchanger is configured to thermally treat, via the heat transfer fluid, at least one electric motor of the vehicle or at least one electrical storage element of the vehicle.

3. The refrigerant circuit as claimed in claim 1, wherein the second heat exchanger is configured to thermally treat, via the heat transfer fluid, at least one electrical storage element of the vehicle.

4. The refrigerant circuit as claimed in claim 1, further comprising a first expansion valve arranged on the first path between the junction zone and the evaporator.

5. The refrigerant circuit as claimed in claim 1, further comprising a second expansion valve arranged on the second path between the junction zone and the first heat exchanger.

6. The refrigerant circuit as claimed in claim 1, further comprising a first expansion device arranged on the main path between the first divergence zone and the evaporator-condenser.

7. The refrigerant circuit as claimed in claim 1, further comprising a second expansion device arranged on the third path between the first divergence zone and the second heat exchanger.

8. The refrigerant circuit as claimed in claim 1, further comprising a fourth path starting in a second divergence zone arranged on the main path between the evaporator-condenser and the junction zone, and ending in a second convergence zone arranged on the main path between the first convergence zone and the accumulation device.

9. The refrigerant circuit as claimed in claim 8, wherein the fourth path comprises a valve controlling the circulation of the refrigerant in the fourth path.

10. A thermal treatment system for a vehicle, comprising:
    a refrigerant circuit including a main path starting at a first convergence zone and ending at a junction zone, the main path including:
    a compressor,
    a radiator configured to perform a heat exchange between the refrigerant and an interior air flow intended to be sent into a vehicle passenger compartment,
    an evaporator-condenser configured to perform a heat exchange between the refrigerant and an exterior air flow outside the vehicle passenger compartment, and
    an accumulation device,
    the refrigerant circuit further including a first path and a second path, both starting at the junction zone and ending at the first convergence zone,
    the first path including an evaporator configured to perform a heat exchange between the refrigerant and the interior air flow,
    the second path including a first heat exchanger configured to perform a heat exchange between the refrigerant and a heat transfer fluid circulating within a heat transfer fluid circuit of the vehicle,
    the refrigerant circuit further including a third path starting at a first divergence zone arranged on the main path between the radiator and the evaporator-condenser and ending at the junction zone, said third path including a second heat exchanger, positioned in parallel relative to the evaporator-condenser in the main path, configured to perform a heat exchange between the refrigerant and the heat transfer fluid of the heat transfer fluid circuit, and
    a heat transfer fluid circuit through which a heat transfer fluid flows, said heat transfer fluid circuit including:
    a main branch provided with a first pump,
    a first heat exchanger configured to thermally treat an electric motor of the vehicle,
    a second heat exchanger configured to perform a heat exchange between the heat transfer fluid and the exterior air flow,
    a second pump, and
    a third heat exchanger configured to thermally treat an electrical storage element of the vehicle,
    the heat transfer fluid circuit including a first branch, a second branch and a third branch,
    the first branch including the first heat exchanger,
    the second branch being arranged in parallel with the first branch,
    the third branch being arranged in parallel with the first branch and the second branch and including the second heat exchanger,
    the heat transfer fluid circuit including a heat transfer fluid circuit bypass device, the bypass device being able to separate the heat transfer fluid circuit into a first loop including, on the one hand, a first portion of the main branch and at least one branch from the first branch or the second branch, and, on the other hand, into a second loop including a second portion of the main branch and at least one branch from the first branch or the third branch.

11. A method for controlling a refrigerant circuit including:
    a main path starting at a first convergence zone and ending at a junction zone, the main path including:

a compressor, a radiator configured to perform a heat exchange between the refrigerant and an interior air flow intended to be sent into a vehicle passenger compartment, an evaporator-condenser configured to perform a heat exchange between the refrigerant and an exterior air flow outside the vehicle passenger compartment, and an accumulation device, the refrigerant circuit further including a first path and a second path, both starting at the junction zone and ending at the first convergence zone, the first path including an evaporator configured to perform a heat exchange between the refrigerant and the interior air flow, the second path including a first heat exchanger configured to perform a heat exchange between the refrigerant and a heat transfer fluid circulating within a heat transfer fluid circuit of the vehicle, the refrigerant circuit further including a third path starting at a first divergence zone arranged on the main path between the radiator and the evaporator-condenser and ending at the junction zone, said third path including a second heat exchanger, positioned in parallel relative to the evaporator-condenser in the main path, configured to perform a heat exchange between the refrigerant and the heat transfer fluid of the heat transfer fluid circuit, wherein:

in a vehicle passenger compartment cooling mode, using the second heat exchanger to condense the refrigerant by heating the heat transfer fluid circulating in the heat transfer fluid circuit, in a vehicle passenger compartment heating mode, using the second heat exchanger as a refrigerant evaporator or condenser, respectively cooling or heating the heat transfer fluid circulating in the heat transfer fluid circuit.

12. The method as claimed in claim 11, in which, during the vehicle passenger compartment heating mode:

during heat transfer fluid cooling, the refrigerant circulating in the third path is expanded to a first pressure level before passing through the second heat exchanger, during heat transfer fluid heating, the refrigerant is circulated in the third path without expansion or by expansion to a second pressure level lower than the first pressure level.

* * * * *